United States Patent [19]
Easley et al.

[11] 3,889,182
[45] June 10, 1975

[54] RESONANT WAVEGUIDE STARK CELL

[75] Inventors: Wesley C. Easley; William F. White, both of Hampton; George A. Wingfield, Newport News, all of Va.

[73] Assignee: The United States of America as represented by the United States National Aeronautics and Spaced Administration Office of General Counsel-Code GP, Washington, D.C.

[22] Filed: Apr. 10, 1974

[21] Appl. No.: 459,736

[52] U.S. Cl........ 324/58.5 A; 23/254 E; 324/58.5 C
[51] Int. Cl............................................. G01r 27/04
[58] Field of Search.......... 324/58 A, 58 C, 58.5 A, 324/58.5 C; 23/254 E, 255 E, 232 E

[56] References Cited
UNITED STATES PATENTS
3,443,217    5/1969    Brinkerhoff................... 324/58.5 A Primary Examiner—Stanley T. Krawczewicz
Attorney, Agent, or Firm—William H. King; Howard J. Osborn; John R. Manning

[57] ABSTRACT

This invention is a resonant waveguide Stark cell suitable for use in a Stark-modulated microwave spectrometer. The cell is constructed from a short length of waveguide. A Stark electrode is located inside the waveguide parallel to the broad face of the guide and insulated from the walls of the guide with narrow teflon strips. A reflector with a small coupling iris at its center is located at one end of the cell. This small coupling iris is for passing microwave energy into and out of the cell. At the other end of the cell there is an adjustable waveguide short making the small Stark cell into a tuneable cavity which can be tuned for resonance at selected microwave frequencies. Means are provided for maintaining a gas-tight compartment within the cell, and ports are provided for the introduction of the gas to be analyzed into the gas-tight compartment.

7 Claims, 2 Drawing Figures

RESONANT WAVEGUIDE STARK CELL

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to microwave spectroscopy and more specifically concerns a resonant waveguide Stark cell for use in microwave spectroscopy.

In the past, two types of cells have been used in Stark modulated microwave spectrometers: broad band nontuneable waveguide Stark cells of several feet in length, and cavities with circular mirror-type reflectors wherein the mirrors themselves serve as the electrodes for application of Stark voltages.

The disadvantages of the broad band nontuneable waveguide Stark cells are the long length of the cells render them unsuitable for use in small portable Stark modulated microwave spectrometers which modern solid state electronics make possible, the large electrode area of the cells result in high capacitance and therefore powerful Stark modulators are required, and the cells are difficult to construct and thus relatively expensive. Also a disadvantage in some analytical applications is that the larger cells require larger sample volumes. The disadvantages of the cavities with circular mirror-type reflectors are that they allow only $\Delta_m = \pm 1$ transitions, giving them more complex Stark patterns, and they need high Stark voltages, becuase of their electrode spacing, to produce sufficient electric field strength for modulation. These high Stark voltages cause electrical discharges between the mirrors unless sample gas pressures are kept very low. Also these cells are difficult to construct and thus relatively expensive.

It is the primary object of the invention to provide a Stark cell for use in microwave spectroscopy that avoids the disadvantages enumerated above of previouw cells. A further object of the invention is to provide a Stark modulated spectrometer that is suitable for use as a portable in situ monitor for certain air pollutants.

SUMMARY OF THE INVENTION

The invention is a resonant waveguide Stark cell for use in a Stark modulated microwave spectrometer. The cell is constructed from a short length of waveguide. A Stark electrode is located inside the waveguide parallel to the broad face of the guide and insulated from the walls of the guide with narrow teflon strips. A reflector with a small coupling iris at its center is located on one end of the cell. At the other end of the cell, there is an adjustable waveguide short making the small cell into a tuneable cavity which can be tuned for resonance at selected microwave frequencies. Means including a thin window (mica or other material) and gaskets (indium or other material) are provided at each end of the cell to provide a gas-tight compartment within the cell. Small ports extend through the cell walls to permit evacuation of the cell, sample gas introduction, or continuous flow of sample gas through the gas-tight compartment.

In use, the gas to be analyzed flows through the cell by way of the small ports. Microwave energy from a microwave source at the frequency of an absorption line of the gas enters the cell through the coupling iris in the reflector at the front of the cell. The Stark cell is then tuned for resonance at the absorption line frequency making the cell a tuned resonant cavity. The microwave energy will therefore make multiple passes along the length of the cell, resulting in an absorption path much longer than the physical cell length. Since the microwave power absorbed by the gas increases as the absorption path increases, this small waveguide cell can equal the performance of a conventional waveguide Stark cell several feet in length. Conventional Stark modulation methods are used to detect the modulated output signal produced by the gas in the cell.

DETAILED DESCRIPTION OF THE INVENTION

Figure 1:
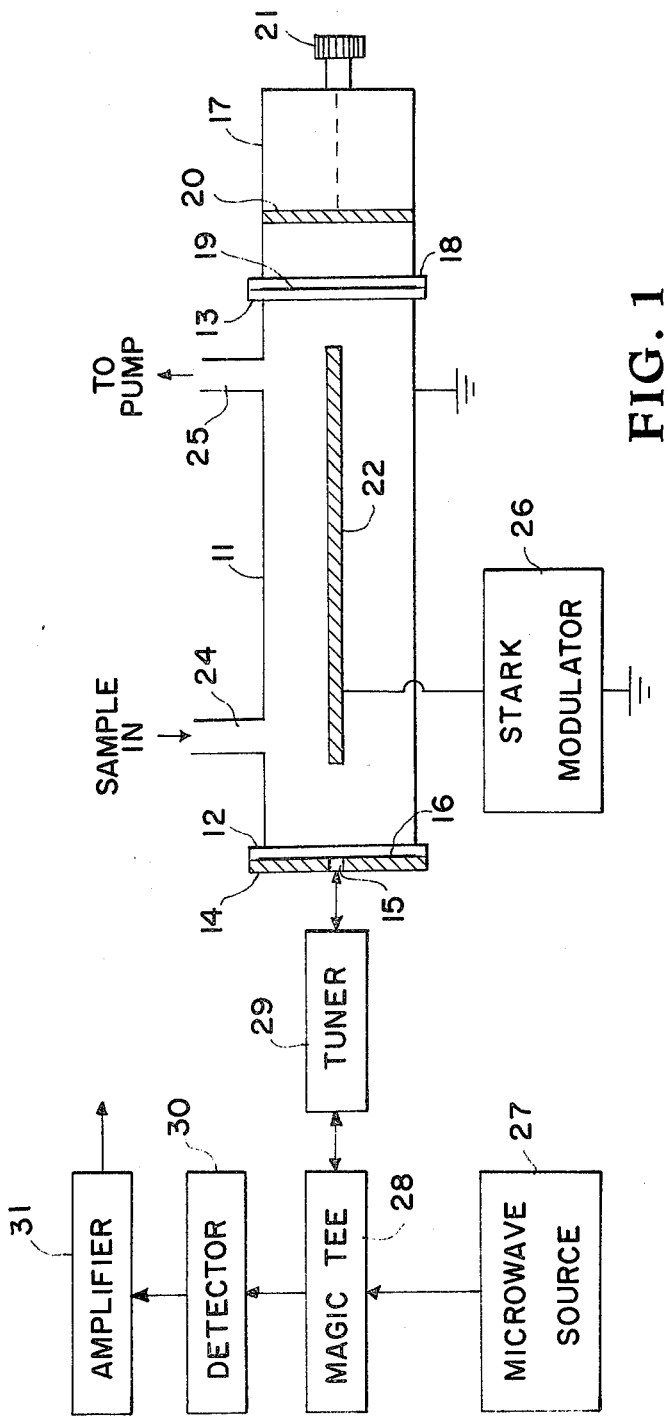
FIG. 1 is a schematic drawing of the invention.

Turning now to the embodiment of the invention selected for illustration in the drawings, the number 11 designates a short length of Ku-band (12.4 to 18.0 GHZ) waveguide with inside dimensions of about 0.790 cm by 1.58 cm and with flanges 12 and 13 at its ends. The length of the waveguide can be, for example, about 15 cm. However, there are no restrictions on the length or cross sectional dimensions of the waveguide. A reflector 14 with a small coupling iris 15 is attached to flange 12 by any suitable means. A thin window 16 that is highly transparent to microwave energy is located between flange 12 and reflector 14. A second short section of Ku-band waveguide with a flange 18 is attached to flange 13 by any suitable means. Located between flanges 13 and 18 is a thin window 19 that is highly transparent to microwave energy. A reflector 20 is located in the section of waveguide 17. Reflector 20 is attached to a tuning knob 21 such that reflector 20 can be made by conventional means to slide back and forth inside the walls of waveguide 17, and thus tune the resonant waveguide cell.

Figure 2:
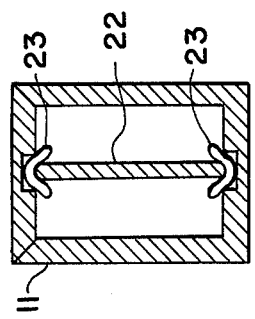
FIG. 2 is a cross-sectional view of the cell shown in FIG. 1

A Stark electrode 22 is located inside the section of waveguide 11 such that it runs parallel with the sides of the waveguide. Electrode 22 is held in place by grooves in the inside of the waveguide 11 and insulated from the sides of waveguide 11 by means of narrow teflon strips 23 as shown in FIG. 2. Vacuum ports 24 and 25 extend into the cell to permit evacuation of the cell, sample gas introduction, or continuous flow of sample gas through the cell. Gaskets not shown are placed between windows 16 and 19 and the waveguide flanges at each end of the Stark cell to make the compartment formed by the section of waveguide 11 and windows 16 and 19 gas tight.

The walls of waveguide 11 are connected to ground and a Stark modulator 26, which is a supply of Stark voltages, is connected to electrode 22. Microwave energy from microwave source 27 passes through a magic tee 28 and a tuner 29 and then enters the cell through coupling iris 15 in reflector 14. The microwave energy is modulated in the cell if there is a gas absorption and passes out of the cell through iris 15, tuner 19, and magic tee 28 to a detector 30. The resulting amplitude modulated signal which corresponds to the gas signal is fed into a lock-in amplifier 31 tuned to the frequency of Stark modulator 26.

In the operation of this invention the gas to be detected flows through the waveguide cell by way of ports 24 and 25. Microwave energy from the source 27 at the frequency of an absorption line of the gas enters the Stark cell through coupling iris 15 in reflector 14. The cell is then tuned for resonance at the absorption line frequency making the cell a tuned resonant cavity. The microwave energy will therefore make multiple passes along the length of the cell resulting in an absorption path much longer than the physical length of the cell. Since the microwave power absorbed by the gas (and hence the sensitivity to small amounts of the absorbing gas) increases as the absorption path increases, this small cell can equal the performance of a conventional waveguide Stark cell several feet in length.

Detection of the absorption signal from this cell is accomplished by normal Stark modulation methods. The Stark modulator 26 applies a square wave voltage at a selected audio frequency between the Stark electrode 22 and the waveguide walls. When the voltage is on, an electric field is applied to the absorbing gas and the absorption frequency is changed because of the well-known Stark effect. When the Stark voltage is off, the absorption frequency is again the frequency of the microwave energy in the cell. Therefore, the absorbed microwave power is modulated at the frequency of the square wave voltage from Stark modulator 26. The modulated power from the cell is coupled out through iris 15, and goes to detector 30, where the amplitude modulated signal is detected, resulting in an alternating voltage output which is fed into lock-in amplifier 31 tuned to the frequency of Stark modulator 26.

Retuning the Stark cell by moving the reflector 20 along the inside of waveguide 17 by means of knob 21 permits use at different microwave frequencies. Thus, many gases having microwave absorption lines can be detected.

Instead of the tuning knob 21, the means for tuning the cell can be constructed using a metal bellows arrangement with a vacuum seal being made between the bellows and waveguide flange 13 on the resonant waveguide Stark cell. A reflector can be attached inside the metal bellows, and tuning would then be accomplished by adjusting the flexible bellows. This would eliminate the need for the window 19 since the reflector in the bellows would produce a gas tight seal and eliminate the loss of signal due to absorption by the window, which occurs with each pass of microwave energy along the length of the cell. As another alternative configuration, the reflector in the bellows arrangement may contain a small iris and the detector can be placed on the end of the bellows not attached to the waveguide flange. This would eliminate the need for magic tee 28 in FIG. 1 because microwave energy from the cavity would impinge directly upon the detector after the energy passed out of the cavity at the end of the cavity opposite from which it entered.

The advantages of this invention are numerous. A short resonant waveguide Stark cell, for example about 15 cm in length, produces an effective absorbing path length equal to a conventional waveguide Stark cell several feet in length. It can utilize small sample quantities of gas because of its small volume. Its Stark electrode results in less capacitance and thus a lower power Stark modulator is sufficient. Its narrow spacing between the Stark electrode and the waveguide wall yields a higher Stark field from a moderate Stark voltage, but the cell may be constructed to permit application of higher Stark voltages, if desired. Because of its size, it is easier to construct and is less expensive than previously used Stark cells. $\Delta_m = 0$ transitions occur, just as in a larger conventional cell.

What is claimed is:

1. A resonant waveguide Stark cell for use in a Stark modulated microwave spectrometer comprising:
   a waveguide cavity whose sides are made from an electrically conductive material, said sides forming a first electrode for said Stark cell;
   a first microwave reflector located at one end of said cavity;
   a small coupling iris in said first microwave reflector for allowing microwave energy to flow into and out of said cavity;
   a second microwave reflector located at the other end of said cavity;
   means for maintaining a gas-tight compartment within said cavity without appreciably interferring with the flow of the microwave energy; and
   ports in said sides of said cavity for allowing sample gas to flow into and out of said compartment.

2. A Stark cell according to claim 1 including means for tuning said cavity for resonance at selected microwave frequencies.

3. A Stark cell according to claim 2 wherein said tuning means is means for moving said second microwave reflector along the sides of said cavity.

4. A Stark cell according to claim 2 wherein said means for maintaining a gas-tight compartment within said cavity includes a window highly transparent to microwave energy at each end of said compartment.

5. A Stark cell according to claim 2 including means for applying Stark voltages to said Stark electrode and for connecting said first electrode to ground.

6. A Stark cell according to claim 5 including means for applying microwave energy to said Stark cell through said small coupling iris and for removing microwave energy from said cell.

7. A Stark cell according to claim 6 including means for demodulating the microwave energy removed from said Stark cell.

* * * * *